United States Patent Office 3,071,634
Patented Jan. 1, 1963

3,071,634
PRODUCTION OF HAZE-FREE
POLYPROPYLENE OIL
John W. Nelson, Lansing, and David W. Young, Homewood, Ill., assignors, by mesne assignments, to Sinclair Research, Inc., New York, N.Y., a corporation of Delaware
No Drawing. Filed Nov. 4, 1959, Ser. No. 850,773
5 Claims. (Cl. 260—683.15)

This invention is a process for making polypropylene oil and includes polymerization of propylene and purification of the polymerization product. Polypropylene oil is a liquid, more or less viscous, polymer having value as a softener or plasticizer for calking and electrical insulation, and as an additive for lubricating oils. In addition, the tacky and non-drying properties of polypropylene oil make it suitable for use as in adhesives for pressure sensitive tapes, printing inks and wax container coatings. These latter applications frequently require a transparent adhesive; however, although some known processes for making polypropylene oil give a clear diluted polymer reaction product containing a dissolved catalyst, partial concentration of the polymer-diluent solution results in a heterogeneous, hazy mixture of polymer and solid catalyst. Filtration of this mixture removes the visible solid but further concentration or complete diluent removal from the filtrate results in a cloudy product. Filtration after complete removal of the diluent, due to the viscous nature of the polymer is slow and expensive.

The process of this invention obviates the need for filtration of polymerizate and yet produces an essentially water-white product suitable even for use in applications requiring transparency. The process of this invention comprises polymerizing propylene in the presence of dissolved $AlBr_3$ at a low temperature and treating the reaction product with an aliphatic alcohol of 3–6 carbon atoms to remove insolubles from the product.

The polymerization is conducted with the propylene in the liquid state and at a low temperature provided by direct or indirect cooling. The temperature of solid carbon carbon dioxide, —78° C., is convenient and preferred, but the polymerization temperature may range from about —150° C. to the boiling point of propylene at the pressure used, advantageously from about —100° C. to —50° C. The pressure during polymerization is generally atmospheric but may range from below atmospheric to 250 p.s.i.g. or more. To insure that the propylene will be in the liquid states for the polymerization reaction as well as to slow the speed of the reaction and dissipate heat, an inert hydrocarbon diluent may be used in an amount of about 100% to 600% or more based on the weight of the propylene. This diluent is a solvent for the propylene and is advantageously a hydrocarbon such as a low-boiling paraffin, including cycloparaffin, of 5 to 12 carbon atoms; e.g. normal and isopentane, normal, iso- and cyclohexane and the like, including mixtures of these hydrocarbons. Normal pentane and hexane are preferred for reasons of economy, although the diluent is recoverable after the polymerization.

The polymerization of propylene requires that the aluminum bromide catalyst be in solution, and although other paraffin diluents have a solubilizing effect on $AlBr_3$, it is preferred to dissolve the bromide in hexane before addition to the reaction mixture. A proportion of solvent is generally used which will provide a catalyst solution containing about 1 to 4% $AlBr_3$, preferably about 2 to 3% and any catalyst over what is soluble is essentially wasted. The amount of catalyst solution to be used in the polymerization process will generally be sufficient to provide at least about 0.1%, e.g. 0.1 to 10%, preferably about 1 to 5% by weight of $AlBr_3$ based on the propylene.

It also is helpful to include in the polymerization mixture about 0.25% or more of a reaction initiator such as tertiary butyl chloride, isobutylene, or other tertiary carbonium ion producer, generally in a proportion of about one part initiator to 35 parts catalyst. It also may be found advantageous to include in the polymerization mixture an oxidation inhibitor such as 2,6 - di(tert-butyl) - 4 - methyl phenol in order to prevent oxidative side reactions.

The polymerization results in the formation of polypropylene in good yields. The polymer, after separation from the other ingredients of the reaction product is a liquid having a viscosity at 210° F., ranging from about 500 to 4000 SUS, and a Staudinger molecular weight of about 500 to 2200.

An important aspect of this invention is the removal of the catalyst without creating a haze in the polymer product. This is done by mixing the reaction product with an aliphatic alcohol of 3 to 6 carbon atoms, e.g. isopropyl alcohol, and allowing the mixture to stratify. The aluminum bromide settles in the lower layer with the alcohol, leaving a clear upper layer. Usually about 0.1 to 1, preferably 0.25 to 0.5 part of alcohol is used for each part of the reaction product. Although aliphatic alcohol has been used to quench propylene polymerizations catalyzed by $AlCl_3$, alcohol has been found to produce a haze in such polymers, and so would not ordinarily be used when a haze-free product is desired. In contradistinction to this, however, these alcohols serve to prevent haze in the product created by the use of an $AlBr_3$ catalyst. It is important that the alcohol be substantially free from water since the bulk of the aluminum bromide must be removed without hydrolysis if a haze-free product is to be recovered without filtration.

After the alcohol is added the mass is agitated preferably at a temperature no higher than about 10° C., and allowed to settle. The alcohol-catalyst layer is removed by liquid-liquid separation, i.e., the layers are separated from each other as liquid phases by, for example, decantation. A further quantity of alcohol is then added to the polymer layer, the amount usually being in the range previously set forth. The resulting mixture is preferably subjected to distillation to reduce its volume substantially, say by about 35 to 60%, by vaporization of the diluent and the catalyst solvent. The alcohol layer is once more removed by liquid-liquid separation and a third washing with a similar amount of alcohol may, if desired, be performed, followed by washing with an aqueous medium until the wash water is essentially neutral. The polymer mass may then be subjected to vacuum topping to remove the remainder of the diluent. The diluent is generally recovered for reuse and the isopropyl or other alcohol also may be recycled after removing spent catalyst from it by distilling off the alcohol. The following examples of the practice of this invention are not to be considered as limiting.

EXAMPLE I

To a jacketed vacuum vessel equipped with an air driven stirrer and thermometer were charged:

1175 g. powdered Dry Ice, 1100 g. pentane, 400 g. propylene, 9 g. aluminum bromide dissolved in 400 g. hexane, all at —78° C., followed by 0.8 g. "Deenex" (2,6-di[tert-butyl]-4-methyl phenol) at room temperature. After stirring the solution 5 minutes one gram of tertiary butyl chloride was added. One and one-half hours later, 100 g. isopropanol was added and stirring was continued another 10 minutes. The mass was then settled for 15 minutes and the clear liquid weighing 1875 g. was poured into a beaker. The catalyst-alcohol mixture and a little solid Dry Ice remained in the vacuum vessel. After adding 0.6 g. "Deenex" the solution was placed on a steam bath and evaporated down until it weighed 841 g.

It had changed from a clear to cloudy solution. One hundred grams of isopropanol were then added and the solution became clear. It was transferred to a separatory funnel and 100 g. water were added. After shaking the mixture and settling, the lower alcohol-water-catalyst layer was dropped out. The mass was then washed 3 times with 200 cc. water. The wash water was neutral after the first water wash. The polymer solution was then topped to 210° C. at 7 mm. pressure. The clear, water-white product weighed 286 g. representing a 72% yield. It had a viscosity of 3150 SUS at 210° F., flash 485° F., 0.004% ash and bromine number 5.3.

EXAMPLE II

In a run made similar to Example I, 1200 g. powdered Dry Ice, 400 g. propylene, 1100 g. pentane, 10 g. aluminum bromide dissolved in 400 g. hexane and 0.7 g. "Deenex" were employed. Two grams of tert. butyl chloride were used to initiate the reaction. After 1½ hours the major part of the catalyst was removed with 100 g. isopropanol. The clear water-white solution weighing 1856 g. was evaporated to 543 g. This proved to be too concentrated for rapid washing because of emulsion formation. Therefore 200 g. of pentane were added and the solution washed as in Example I. It was topped to 213° C. at 5 mm. pressure. The water-white, clear product weighed 276 g. It had a viscosity of 3100 SUS at 210° F., 485° F. flash, 0.000% ash, and 6.6 bromine number.

EXAMPLE III

In a run similar to Examples I and II above, the catalyst was deactivated with 200 g. of isopropanol and 20 g. of water. Although the product was washed 4 times with 300 cc. of water the topped product had a haze in it. The yield was 70%. It had a 3500 SUS viscosity at 210° F., flash 510° F., 0.005% ash and 5.0 bromine number.

The following Table I illustrates reaction conditions and polymer descriptions in some additional typical aluminum bromide catalyzed polymerizations.

*Table I*

| Run No. | 46 | 49 | 51 |
|---|---|---|---|
| Cat., Wt. Percent on C₃ | 2.6 | 3.5 | 3.5 |
| Time, hrs | 1.5 | 2 | 1.5 |
| Product: | | | |
| Yield, Percent | 68.5 | 71 | 75 |
| SUS at 210° F | 3,580 | 3,675 | 3,400 |
| Flash, ° F | 510 | 495 | 495 |
| Ash, Percent | 0.015 | 0.000 | 0.0017 |
| Bromine No | 4.9 | 4.7 | 4.5 |

We claim:
1. A method for the production of polypropylene oil which comprises polymerizing propylene in the liquid phase at a temperature of about −100 to −50° C. and in the presence of about 100 to 600% based upon the weight of said propylene of an inert hydrocarbon diluent which is a paraffin of 5 to 12 carbon atoms and about 0.1 to 10% based upon said propylene of dissolved AlBr₃ catalyst to obtain polymer oil, combining the reaction mixture with about 0.1 to 1 part of an aliphatic substantially water-free alcohol of 3 to 6 carbon atoms per part of the reaction product, separating the resulting alcohol catalyst mixture by liquid-liquid separation from the polymer oil to remove the bulk of the catalyst while avoiding hydrolysis of the catalyst, distilling the reaction mixture to reduce its volume by about 35 to 60% through vaporization of hydrocarbon diluent, washing the reaction mixture with an aqueous medium until said medium is essentially neutral, and vacuum topping the reaction mixture to remove remaining hydrocarbon diluent and obtain a haze-free polymer oil product.

2. The method of claim 1 in which the substantially water-free alcohol is isopropanol.

3. The method of claim 1 in which the AlBr₃ is dissolved in hexane.

4. A method for the production of polypropylene oil which comprises polymerizing propylene in the liquid phase at a temperature of about −100 to −50° C. and in the presence of about 100 to 600% based upon the weight of said propylene of an inert hydrocarbon diluent which is a paraffin of 5 to 12 carbon atoms and about 1 to 5% based upon said propylene of dissolved AlBr₃ catalyst to obtain polymer oil, combining the reaction mixture with about 0.1 to 1 part of an aliphatic substantially water-free alcohol of 3 to 6 carbon atoms per part of the reaction product, separating the resulting alcohol catalyst mixture by liquid-liquid separation from the polymer oil to remove the bulk of the catalyst while avoiding hydrolysis of the catalyst, distilling the reaction mixture to reduce its volume by about 35 to 60% through vaporization of hydrocarbon diluent, adding to the reaction mixture about 0.1 to 1 part of an aliphatic substantially water-free alcohol of 3 to 6 carbon atoms in an amount of about 0.1 to 1 part of alcohol per part of the reaction product, adding water to the resulting mixture, removing an alcohol-water-aluminum bromide catalyst layer from the reaction mixture, washing the reaction mixture with an aqueous medium until said medium is essentially neutral, and vacuum topping the reaction mixture to remove remaining hydrocarbon diluent and obtain a haze-free polymer oil product.

5. The method of claim 4 in which the substantially water-free alcohol is isopropanol.

References Cited in the file of this patent

UNITED STATES PATENTS

| | | |
|---|---|---|
| 2,447,313 | Carmody et al. | Aug. 17, 1948 |
| 2,521,940 | Oriolo | Sept. 12, 1950 |
| 2,678,957 | Fontana et al. | May 18, 1954 |